United States Patent [19]
Seymour et al.

[11] Patent Number: 5,725,085
[45] Date of Patent: Mar. 10, 1998

[54] INTERLOCK ARRANGEMENT FOR CIRCUIT BREAKER COMPARTMENTS

[75] Inventors: Raymond K. Seymour, Plainville; Michael C. Guerrette, Bristol; William H. Calder; Dennis J. Doughty, both of Plainville, all of Conn.

[73] Assignee: General Electric Company, New York, N.Y.

[21] Appl. No.: 653,596

[22] Filed: May 24, 1996

[51] Int. Cl.⁶ .................................................. H01H 9/26
[52] U.S. Cl. ........................ 200/50.33; 335/160; 361/609
[58] Field of Search ................................ 200/17 R, 18, 200/51 R, 50.21, 50.33, 50.35; 335/160; 361/607, 609, 615

[56] References Cited

U.S. PATENT DOCUMENTS

| | | | |
|---|---|---|---|
| 3,663,773 | 5/1972 | Powell | 200/50 AA |
| 4,286,242 | 8/1981 | Mrenna | 335/160 |
| 4,317,160 | 2/1982 | Tillson et al. | 361/339 |
| 4,489,362 | 12/1984 | Castonguay et al. | 361/339 |
| 4,499,344 | 2/1985 | Castonguay et al. | 200/50 C |
| 4,516,100 | 5/1985 | Wallace | 335/160 |
| 4,827,089 | 5/1989 | Morris | 200/50 C |
| 5,436,415 | 7/1995 | Smith | 200/50 C |
| 5,486,978 | 1/1996 | Fishovitz | 361/617 |

Primary Examiner—Gerald P. Tolin
Attorney, Agent, or Firm—Richard A. Menelly; Carl B. Horton

[57] ABSTRACT

An interlock arrangement between a pair of industrial rated circuit breakers in adjoining circuit breaker compartments utilizes a pair of circuit breaker interlock units, one mounted on the rear surface of each circuit breaker. A corresponding pair of compartment interlock units are arranged within the circuit breaker compartments for interaction between the two circuit breaker interlock units to open the contacts within one of the circuit breakers when an attempt is made to electrically connect the circuit breaker within one compartment when the circuit breaker in the adjoining compartment is already electrically connected within the adjoining compartment.

16 Claims, 6 Drawing Sheets

FIG. 6C ized representative of the state-of-the-art of such interlocked circuit breakers as used with main and auxiliary circuit breaker installations to insure that only one circuit breaker is operational within a given electrical distribution circuit at one time.

INTERLOCK ARRANGEMENT FOR CIRCUIT BREAKER COMPARTMENTS

BACKGROUND OF THE INVENTION

Circuit breaker compartments generally employ an interlock arrangement to prevent the circuit breaker plugs from being connected with or disconnected from the compartment power stabs when the circuit breaker contacts are closed. U.S. Pat. No. 3,663,773 discloses an interlock mechanism that interferes with the contact push rod when the circuit breaker contacts are closed for preventing withdrawal of the circuit breaker. U.S. Pat. No. 4,317,160 discloses an interlock mechanism which operates on the tripping plunger rod to prevent the circuit breaker from being removed from the compartment power stabs when the circuit breaker contacts are closed.

U.S. Pat. Nos. 4,489,362 and 4,499,344 are representative of the state-of-the-art of such interlocked circuit breakers as used with main and auxiliary circuit breaker installations to insure that only one circuit breaker is operational within a given electrical distribution circuit at one time.

With such interlock arrangements, the stand-by circuit breaker generally remains in a non-reset condition such that the circuit breaker operating springs must be charged before the stand-by circuit breaker is turned ON to replace the operating circuit breaker. U.S. patent application Ser. No. 08/613,801, filed Mar. 1, 1996 entitled "System For Resetting High Ampere Rated Circuit Breaker Operating Springs" describes a circuit breaker wherein the circuit breaker operating mechanism springs are charged after contact separation to allow rapid connection of the circuit breaker contacts within the associated electrical distribution system.

One purpose of the instant invention is to provide a circuit breaker interlock arrangement that prevents the contacts of either one of first and second adjoining circuit breakers from being closed while the other circuit breaker contacts are closed. The operating mechanism of the second circuit breaker having the open contacts can be reset to charge the operating mechanism springs without interfering with the ON status of the first circuit breaker.

SUMMARY OF THE INVENTION

The circuit breaker compartment interlock arrangement of the invention utilizes a pair of slotted rotational levers, one mounted on the rear surface of a pair of first and second adjoining circuit breakers in first and second compartments and a corresponding pair of first and second sliding post levers, each mounted within the first and second compartments and interconnected. The operating mechanism tripping plunger rod in the first compartment circuit breaker trips the associated first circuit breaker operating mechanism to open the first circuit breaker contacts when an attempt is made to close the first circuit breaker contacts when the second circuit breaker contacts in the second circuit breaker are already closed, and vice versa.

DESCRIPTION OF THE PREFERRED EMBODIMENT

Before describing the circuit breaker interlock arrangement of the invention, it is helpful to review the interlock described within the aforementioned U.S. Pat. No. 4,499,344 which consists basically of two sets of components, one of which is mounted on the rear surface of the circuit breaker itself and is defined as the "circuit breaker mounted interlock assembly", and the other of which, defined as the "compartment mounted interlock assembly" is mounted on the rear wall of the circuit breaker compartment.

Figure 1:
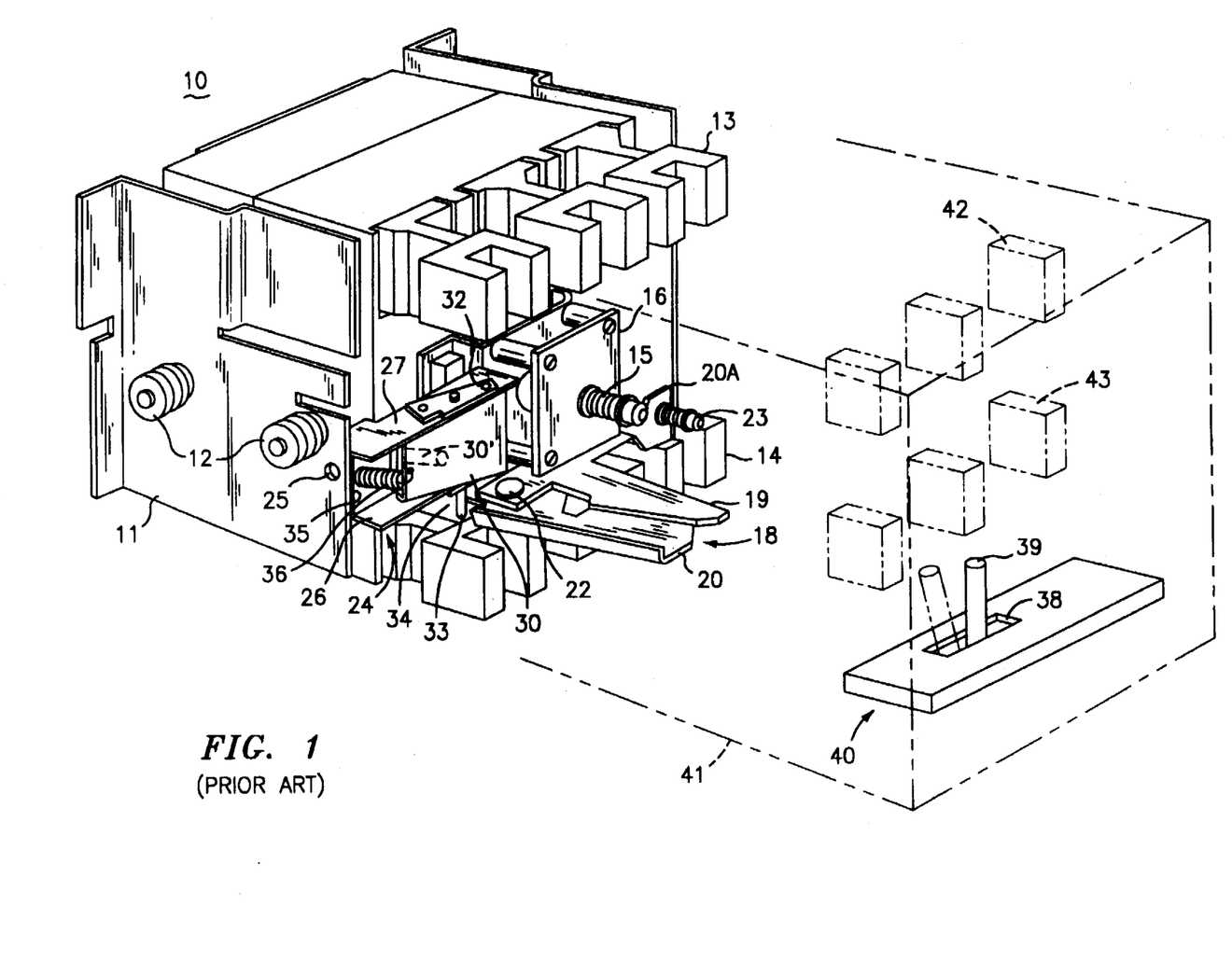
FIG. 1 is a front perspective view of an interlock assembly attached to the rear of a compartmented breaker according to the prior art.

FIG. 1 shows one such compartment-mounted circuit breaker 10 having a sideplate 11 attached to the circuit breaker and containing a pair of wheels 12 for moving the circuit breaker in and out of the compartment 41 depicted in phantom. Three line plugs 13 are attached to the rear surface of the circuit breaker along with three load plugs 14 for mating with corresponding line and load stabs 42, 43 on the compartment rear wall. The circuit breaker plugs are connected with the compartment stabs by means of a racking screw 15 attached to the rear surface of the circuit breaker by means of a journal plate 16. An interlock mechanism 18 consisting of a fixed finger 19 and a moveable finger 20 serves to trip the circuit breaker via the moveable finger extension 20A and trip plunger 23 when an attempt is made to disconnect the circuit breaker plugs from the compartment stabs when the circuit breaker contacts (not shown) are closed. The circuit breaker mounted interlock assembly 24 is attached to the circuit breaker carriage sideplate 35 by means of screws 25. The bottom plate 26 supports a paddle 30 and a spring 36 for biasing the paddle toward the back wall of the circuit breaker. The paddle 30 is supported between bottom and top plates 26, 27 by means of a pair of link pins 32 and an actuator pin 33. The bottom of actuator pin 33 abuts an extension tab 34 on moveable finger 20, which is pivotally connected with the fixed finger 19 by means of pivot 22. The other end of moveable finger 20, denoted as 20A, is hooked to the trip plunger 23 causing the circuit breaker to trip upon the following interlock interaction. The actuator pin 33 senses the condition of the circuit breaker contacts via the circuit breaker contact push rod or plunger 30' and, by movement of the moveable finger 20 and moveable finger extension 20A, displaces the trip plunger 23 to articulate the circuit breaker operating mechanism for opening the circuit breaker contacts in the manner best described in the aforementioned U.S. Pat. No. 4,499,344. The actuator post 39 extending upwards from within the elongate slot 38 on the compartment mounted actuator unit 40, interlocks with a corresponding compartment mounted interlock unit in and adjoining compartment (not shown). Within the actuator post 39 associated with a circuit breaker in an interlocked compartment having open contacts, the post assumes the position indicated in solid lines and the movable finger 20, upon contact with the actuator post 39 is unable to rotate upon contact between the extension tab 34 and the actuator pin 33 indicative of open contacts within the circuit breaker 10. The movable finger extension 20A of the moveable finger 20 is thereby prevented from displacing the trip plunger 23 and articulating the operating mechanism within circuit breaker 10. With the contacts in the associated interlocked circuit breaker open, the circuit breaker 10 now connects with the electrical distribution system associated with the compartment 41 by capture of the line and load stabs 42, 43 within the compartment 41 within the line and load plugs 13, 14 extending from the circuit breaker 10. With the contacts in the associated interlocked circuit breaker in the closed position, the actuator post 39 extending from the compartment associated interlock unit 40 assumes the position indicated in phantom in the compartment 41. The fixed finger 19 prevents transfer of the circuit breaker 10 completely within the compartment 41 to thereby prevent connection between the circuit breaker line and load plugs 13, 14 and the compartment line and load stabs accordingly.

Figure 2A:
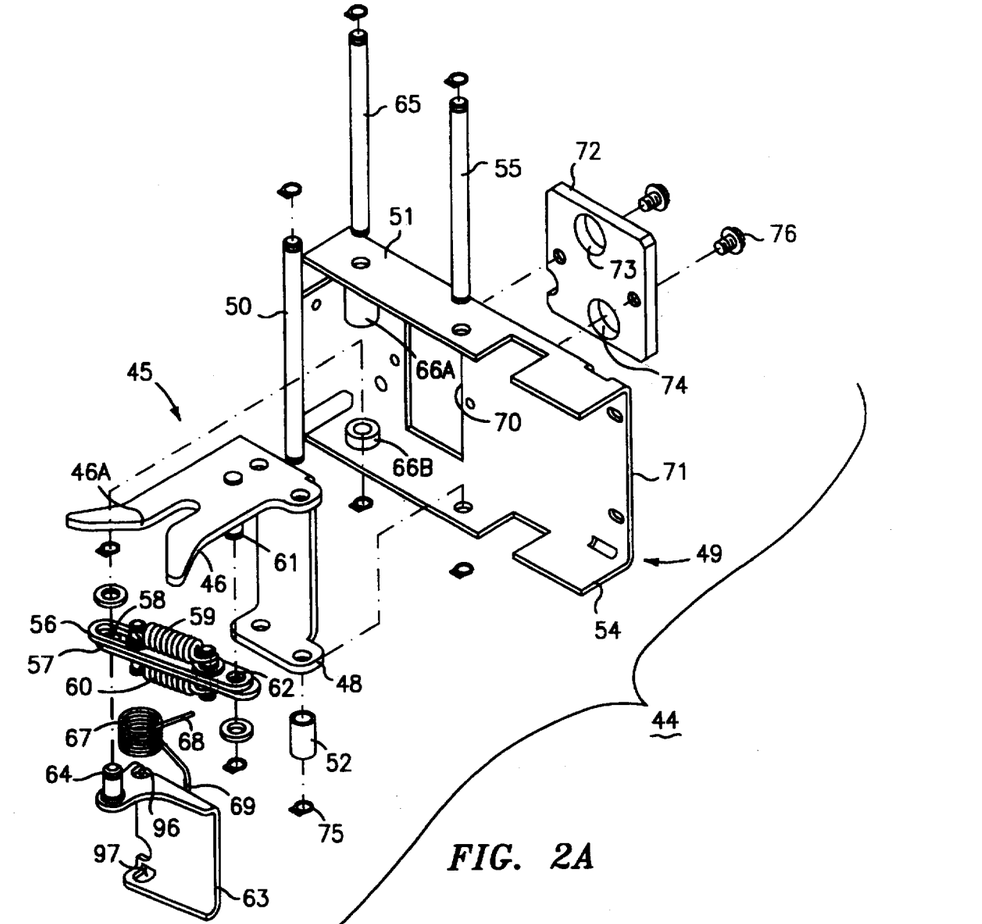
FIG. 2A is a top perspective view, in isometric projection, of the components within the slotted rotational lever used with the interlock assembly according to the invention.
Figure 2B:
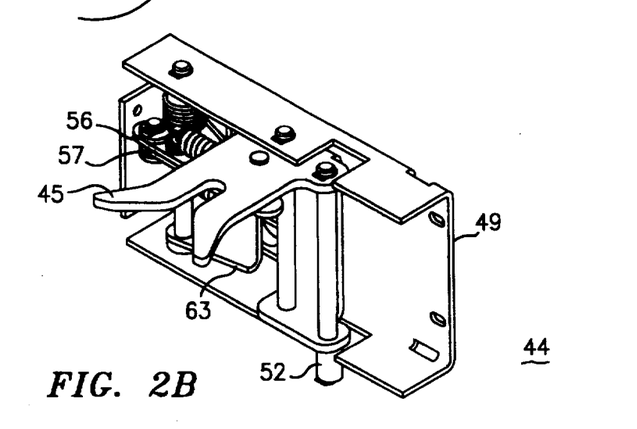
FIG. 2B is a top perspective view of the slotted rotational lever assembled from the components depicted in FIG. 2A.
Figure 3A:
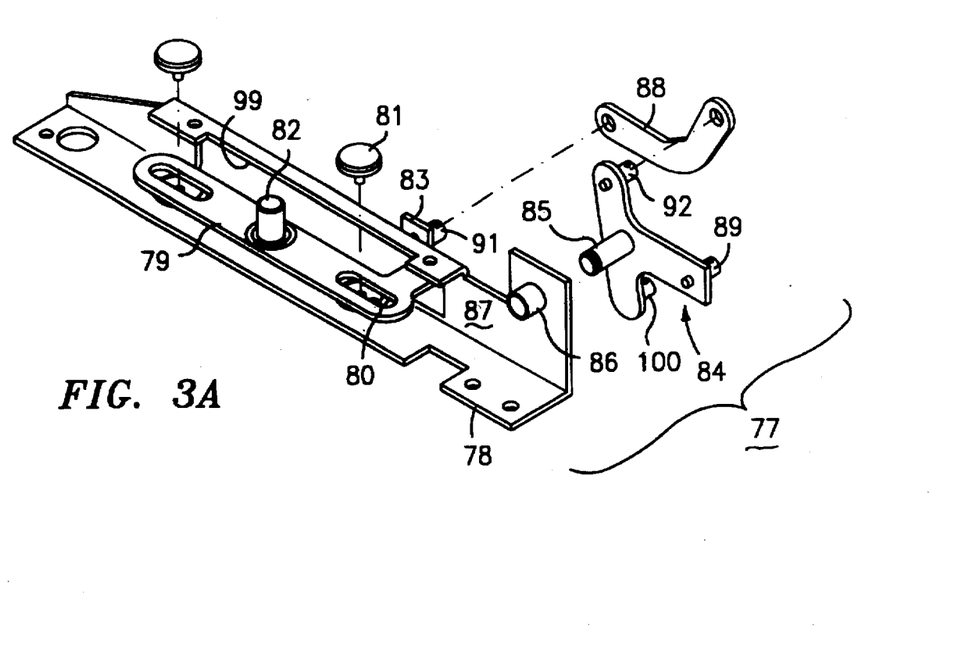
FIG. 3A is a top perspective view, in isometric projection, of the components within the sliding post lever used with the interlock assembly according to the invention.
Figure 3B:
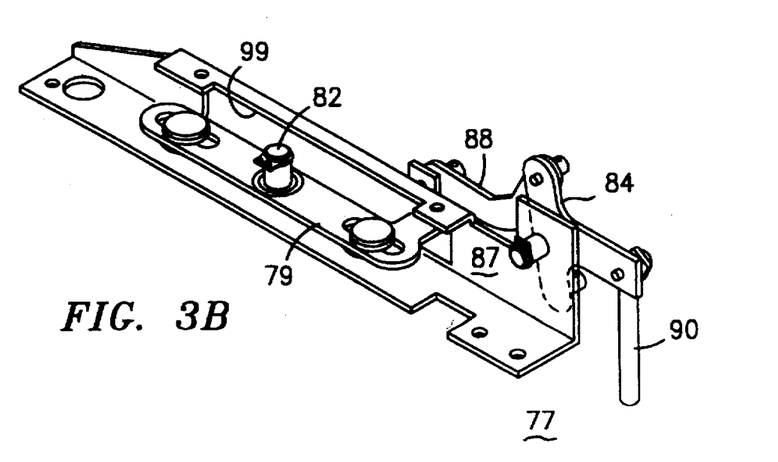
FIG. 3B is a top perspective view of the sliding post lever assembled from the components depicted in FIG. 3A.

In accordance with the teachings of the invention, a circuit breaker actuator unit, hereinafter "CB ACTUATOR unit" 44, is shown in FIGS. 2A, 2B and a circuit breaker compartment actuator unit, hereinafter "COMP unit" 77 is shown in FIGS. 3A, 3B. The CB ACTUATOR unit 44 is in the form of a slotted rotation lever or yoke 45 that is pivotally attached to a U-shaped support 49 by means of a pivot post 55 that extends through the top and bottom walls 51, 54 of the support and the top and bottom extensions 46, 48 of the yoke. To simplify the attachment between the components, snap rings 75 are used in nearly all the attachment operations. A pair of pair of links 56, 57 sandwiched between a corresponding pair of extension springs 59, 60 are attached at one end to the top extension 46 by means of a post 61 and by means of thru-holes 62, as indicated. The other end of the links 56, 57 are attached to the post 64 extending from the top of a detector lever 63 via an elongated slot 58. The interconnection between the detector lever 63 and the yoke 45 provides overtravel compensation between the components to prevent binding or other damage to these components during a race condition where both circuit breakers are trying to trip each other. The detector lever is pivotally attached to the support 49 by means of an extended post 65, journals 66A, 66B coil spring 67 and thru-holes 96, 97. One end 68 of the coil spring is positioned against the front of the wall 71 of support 49 and the other end 69 is positioned against back of the detector lever 63 to bias the lever back to a home position after contacting the circuit breaker contact plunger 30' in the manner to be described below. An actuator pin 50 extends through the top and bottom extensions 46, 48 of the yoke 45 and terminates in a collar 52 for interacting with the circuit breaker trip mechanism as will be discussed below. A plate 72 containing apertures 73, 74 is attached to the back wall 71 of the support 49 by means of fasteners 76 and the apertures 73, 74 are aligned with the rectangular slot 70 to allow for the transfer of the trip plunger 23 shown earlier in FIG. 1 into contact with the detector lever 63 to determine the ON and OFF conditions of the circuit breaker contacts as described in the aforementioned U.S. Pat. No. 4,499,344.

The COMP unit 77, as depicted in FIGS. 3A, 3B is in the form of a right-angled frame 78 to which a slide plate 79 is attached by means of fasteners 81. A pair of elongated slots 80 allow the actuator post 82 upstanding from the slide plate to move in both directions along the frame 78. The upright tab 83 containing a post 91 extends from the slide plate 79 through the slot 99 in the wall 87 on the frame 78. A T-lever 84 is pivotally supported on the wall 87 by means of the pivot post 85 extending from the T-lever and the journal 86 extending from the opposite side of the wall 87. A C-shaped link 88 connects between the slide plate 79 and the T-lever 84 by posts 91 and 92 respectively. The connecting rod 90 is used to interconnect the T-levers when used within adjoining circuit breaker compartments. When the COMP unit 77 is used within horizontally-arranged interlocked circuit breaker compartments, the connecting rod 90 is attached to posts 100 extending from the T-lever 84 and when used within vertically-arranged interlocked circuit breaker compartments, the connecting rod 90 is attached to posts 89.

Figure 4:
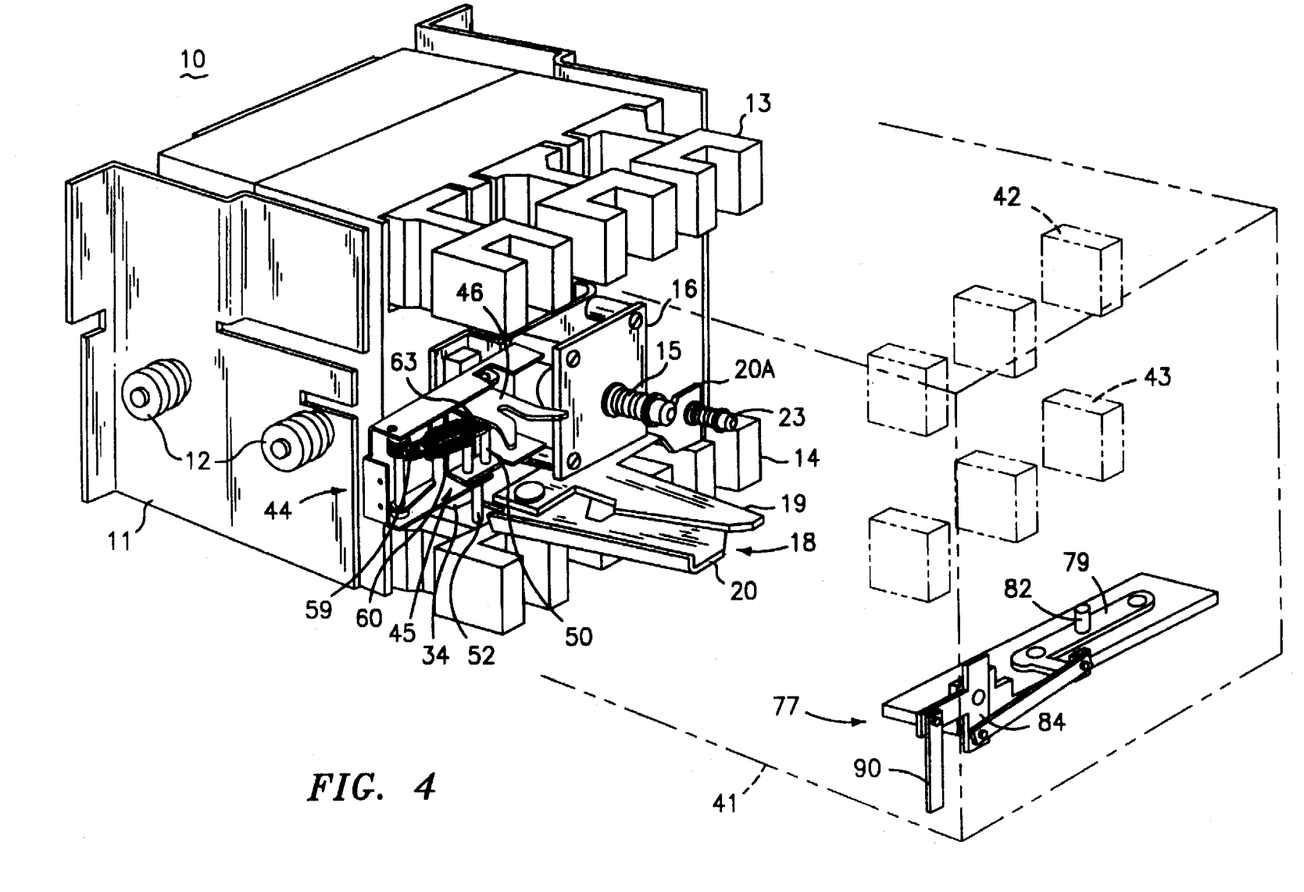
FIG. 4 is a front perspective view of an interlock assembly attached to the rear of a compartmented breaker according to the invention.

The operation of the CB actuator unit 44 and the COMP actuator unit 77 is best seen by now referring to the circuit breaker 10 and the circuit breaker compartment 41 depicted in FIG. 4. The arrangement is similar to that described earlier in FIG. 1 and like reference numerals will be employed. The earlier interlock 24 of FIG. 1 is replaced with the CB actuator unit 44 that is positioned over the interlock mechanism 18 including the elements 19, 20, 20A and 23. The cylinder 52 interacts with the extension tab 34 when the trip plunger 23 contacts the detector lever 63 to rotate the top extension 46 of the yoke 45 and position the slot 46A with respect to the actuator post 82 on the slide plate 79 on the COMP unit 77 within the associated circuit breaker compartment 41. When the contacts within the circuit breaker 10 are in the closed position and the actuator post 82 is in a position indicative of the closed position of a second interlocked circuit breaker (not shown) that is associated with a second COMP actuator unit (not shown) connecting with an opposite end of the connecting rod 90, the cylinder 52 contacts the extension tab 34 and displaces the trip plunger 23 to hold the second circuit breaker 10 in a tripped position. Any attempt to close the second circuit breaker will cause the breaker to discharge its operating springs and remain in the open position. When the trip plunger 23 is away from the detector lever 63, the yoke 45 is returned to a center or home position by the return bias provided by the coil springs 67-69. In the event that the contacts within circuit breaker 10 and the second interlocked circuit breaker are both in the off position and the top extensions 46 of both CB actuator units 44 are engaged with the actuator posts 82 on the associated COMP units 77 there would then be a race between the circuit breaker operating mechanisms if an attempt was made to close both of the contacts of the interlocked circuit breakers at the same time. To prevent the uncertainty as to which of the interlocked circuit breakers would win the race, one of the compression springs 59, 60 is omitted from the links 56, 57, shown in FIG. 2A, or replaced with a solid link within one CB actuator unit 44 so that the circuit breaker employing the CB actuator unit with the single extension spring would be restrained from turning on against the bias provided by the two compression springs or solid link within the other CB actuator unit 44.

Figure 5A:
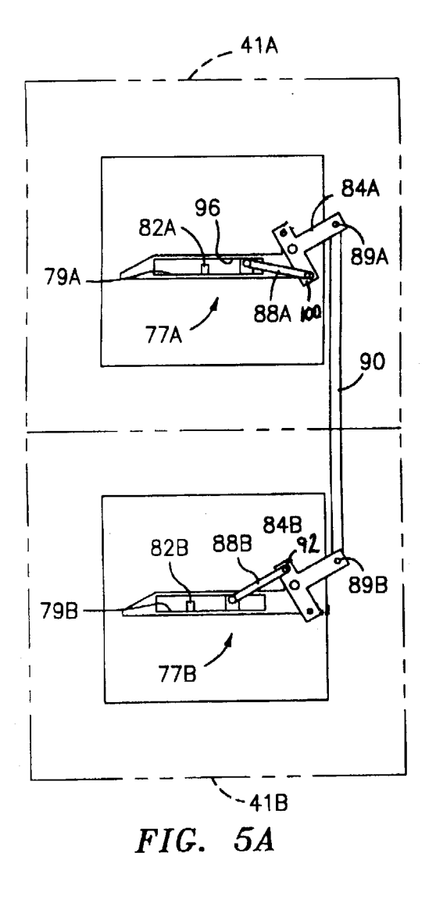
FIGS. 5A–5C are planar front views of a pair of circuit breaker enclosures vertically interlocked in accordance with the invention.
Figure 5B:
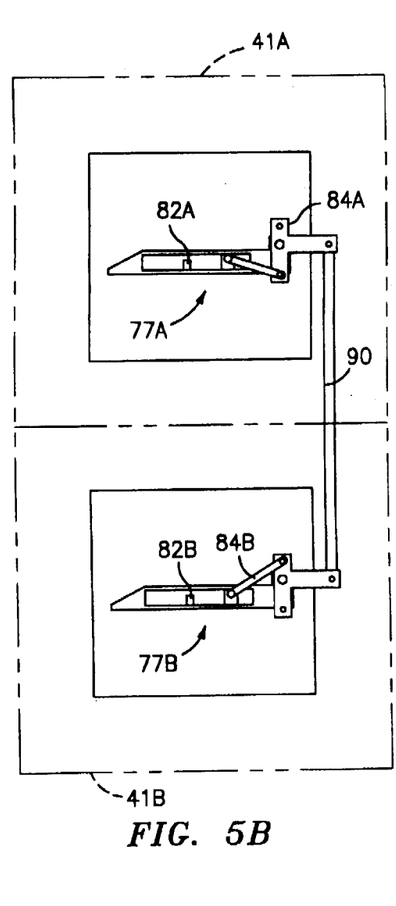
Figure 5C:
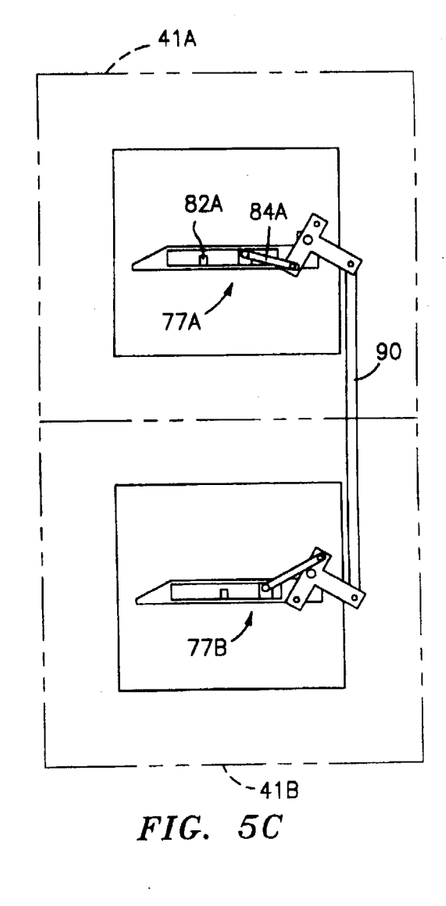

The interconnection between a pair of vertically-interlocked circuit breaker compartments 41A, 41B is depicted in FIGS. 5A–5C wherein the components within compartment 41A are designated A and the identical components within compartment 41B are designated B. It is noted that the connection between the links 88A on the T-levers 84A and the slide plates 79A is made by means of posts 100 in compartments 41A and that the connection between the links 88B on the T-levers 84B and the slide plates 79B is made by means of opposite posts 92 in compartment 41B. This opposite link arrangement is an important feature of the invention since it insures that the direction of motion for the respective slide plates is in opposite directions. The connecting rods 90 extend between posts 89A, 89B at the same end of the T-levers 84A, 84B to further insure the respective directions of motion for the slide plates. In the arrangements depicted in FIGS. 5A–5C, the actuator posts 82A, 82B are in the position that would result when each of the posts is captured in a corresponding circuit breaker V-shaped slot 46A within the corresponding circuit breaker yoke 45 as shown in FIG. 4, for example. In FIG. 5A, the position of the actuator post 82B to the right of the slide plate 79B indicates that the associated circuit breaker is in the ON condition, while the position of the actuator post 82A to the left of the slide plate 79A indicates that the associated circuit breaker is in the TRIPPED condition. In FIG. 5B, the position of both actuator posts 82A, 82B is at the center of the slide plates 79A, 79B which indicates that both of the associated circuit breakers are in the OFF condition. If and attempt is made to turn on either of the associated circuit breakers with both of the circuit breakers in the OFF condition, the circuit breaker that contains the CB actuator unit 44 having the pair of springs 59, 60 or solid link shown earlier in FIG. 2A, will turn on and the interlocked circuit breaker that contains the CB actuator unit with a single spring will revert to the TRIPPED condition as described earlier. In FIG. 5C the position of the actuator plate 82A to the left of the slide plate 79A indicates that the associated circuit breaker is in the TRIPPED condition, while the position of the actuator post 82B to the right of the slide plate 79B indicates that the associated circuit breaker is in the ON condition.

Figure 6A:
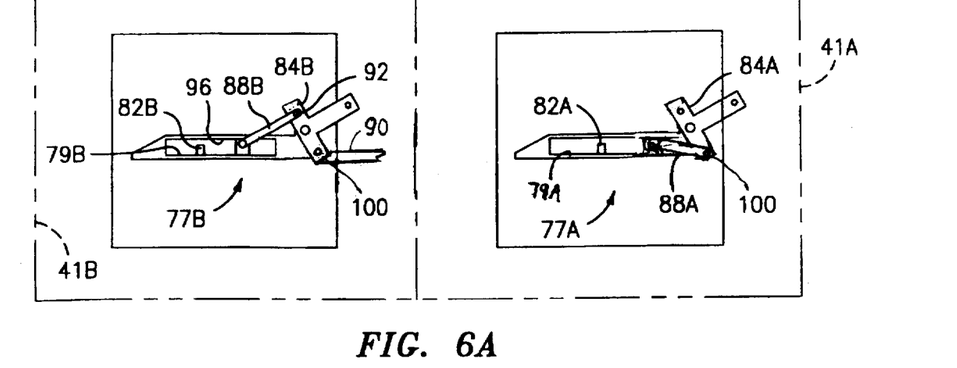
FIGS. 6A–6C are planar front views of a pair of circuit breaker enclosures horizontally interlocked in accordance with the invention.
Figure 6B:
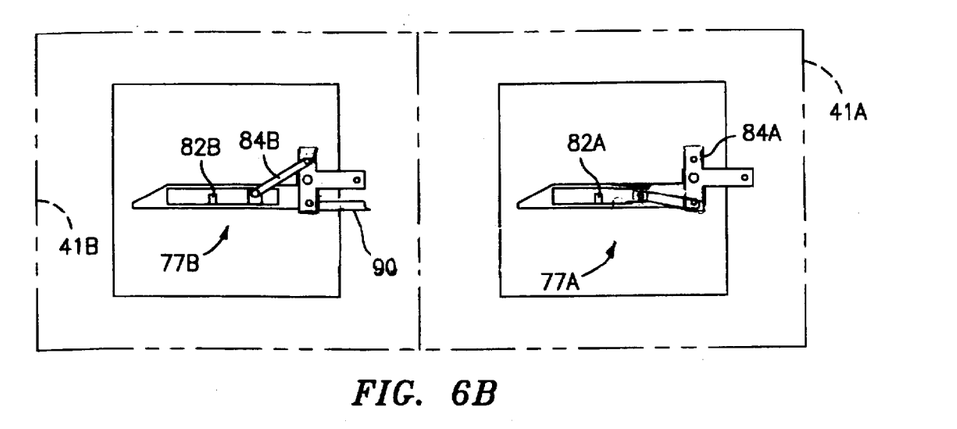
Figure 6C:
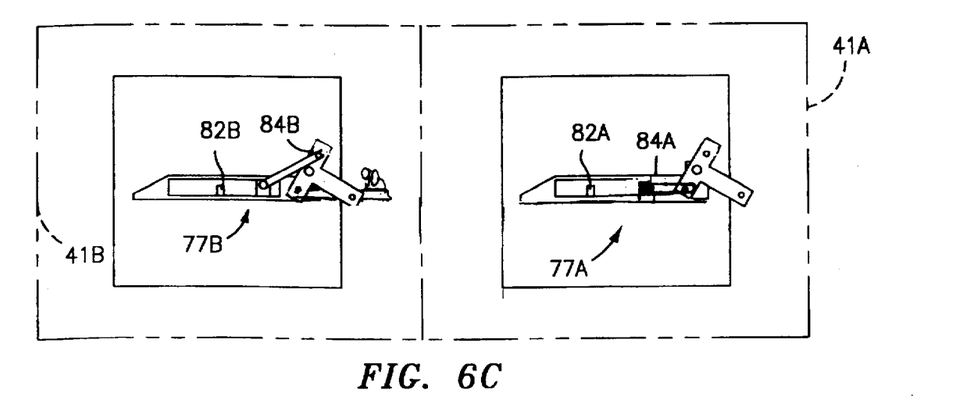

The interconnection between a pair of horizontally-interlocked circuit breaker compartments 41A, 41B is depicted in FIGS. 6A–6C wherein the components within compartment 41A are designated A and the identical components within compartment 41B are designated B. It is noted that the connection between the links 88A on the T-levers 84A and the slide plates 79A is made by means of posts 100 in compartments 41A and that the connection between the links 88B on the T-levers 84B and the slide plates 79B is made by means of opposite posts 92 in compartments 41B as with the arrangements depicted earlier. Connection between the T-levers 84A and the connecting rods 90 is made by posts 100 in compartments 41A and connection between the T-levers 84B and the connecting rods 90 is made by posts 100 in compartments 41B. This arrangement insures that the slide plates 79A and actuator posts 82A in compartments 41A will move in opposite directions from the interconnected slide plates 79B and actuator posts 82B in compartments 41B. The actuator posts 82A, 82B are in the position that would result when each of the posts is captured in a corresponding circuit breaker V-shaped slot 46A within the corresponding circuit breaker yoke 45 as with the arrangements depicted earlier in FIGS. 5A–5C. Comparing the FIGS. 6A–6C to FIGS. 5A–5C shows similar interaction between the COMP actuators 77A and 77B in the respective compartments 41A, 41B.

An arrangement for interlocking between high ampere-rated compartmented circuit breakers has herein been described wherein only one of a pair of interlocked circuit breakers can be turned on at one time. The circuit breakers although turned to the TRIPPED condition within the compartment is capable of later being turned on without having to recharge the circuit breaker operating mechanism closing springs.

We claim:
1. A circuit breaker compartment interlock assembly comprising:
   a first circuit breaker interlock mounted on a first circuit breaker within a first circuit breaker compartment, said first circuit breaker including a first operating mechanism arranged for separating a first pair of contacts, and associated with a first contact push rod extending from said first circuit breaker to sense whether said first contacts within said first circuit breaker are closed and associated with a first circuit breaker trip rod associated with said first operating mechanism to actuate said first circuit breaker trip rod and separate said first contacts;
   a first compartment interlock mounted in said first compartment interacting with said first circuit breaker interlock and with a second compartment interlock mounted in a second circuit breaker compartment containing a second circuit breaker, said second circuit breaker including a second operating mechanism arranged for separating a second pair of contacts for causing said first circuit breaker interlock to actuate said first circuit breaker trip rod and separate said first contacts;
   a second circuit breaker interlock associated with a second contact push rod extending from said second circuit breaker to sense whether said second contacts within said second circuit breaker are closed and with a second circuit breaker trip rod for actuating said second trip rod to separate said second contacts said first circuit breaker interlock comprising a first yoke pivotally mounted on a first interlock support and a first detector lever connecting with said first yoke to thereby rotate said first yoke and actuate said first trip rod, said first yoke is connected with said first detector lever by means of a first spring force, said second circuit breaker interlock comprises a second yoke pivotally mounted on a second interlock support and a second detector lever connecting with said second yoke to thereby rotate said second yoke and actuate said second trip rod, and said second yoke is connected with said second detector lever by means of a second spring force, said second spring force being greater than said first spring force.

2. The interlock assembly of claim 1 wherein said first and second compartment interlocks are interconnected by means of an extended connecting rod.

3. The interlock assembly of claim 1 wherein said first detector lever is pivotally arranged about a first return spring for returning said first detector lever to a home position in the absence of contact with said first contact push rod.

4. The interlock assembly of claim 1 wherein said first compartment interlock comprises a first slide plate arranged on a first base of a first angular frame and includes a first actuator post upstanding from said first base, said first post being positioned within said first compartment and is captured by said first yoke when said first circuit breaker is inserted within said first compartment.

5. The interlock assembly of claim 4 wherein said first compartment interlock includes a first T-shaped connector lever having a first pivot post extending from one side for pivotally attached to said first connector frame and a plurality of first connector posts extending from an opposite side thereof.

6. The interlock assembly of claim 5 wherein said first compartment interlock includes a first link connecting between said first T-shaped connector and said first slide plate.

7. The interlock assembly of claim 1 wherein said second compartment interlock comprises a second slide plate arranged on a second base of a second angular frame and includes a second actuator post upstanding from said second base, said second post being positioned within said second compartment and is captured by said second yoke when said second circuit breaker is inserted within said second compartment.

8. The interlock assembly of claim 7 wherein said second compartment interlock includes a second T-shaped connector lever having a second pivot post extending from one side for pivotal attachment to said second connector frame and a plurality of second connector posts extending from an opposite side thereof.

9. The interlock assembly of claim 8 wherein said second compartment interlock includes a second link connecting between said second T-shaped connector and said second slide plate.

10. The interlock assembly of claim 4 wherein said first circuit breaker compartment is arranged on top of said second circuit breaker compartment.

11. The interlock assembly of claim 4 wherein said first circuit breaker compartment is arranged alongside of said second circuit breaker compartment.

12. The interlock assembly of claim 10 wherein said first T-shaped connector defines a first cross arm and a first extending leg, and said second T-shaped connector defines a second cross arm and a second extending leg, said first link being connected to one end of said first crossarm and said first extending leg being connected to one end of said connecting rod.

13. The interlock assembly of claim 12 wherein said second link is connected to an opposite end of said second cross arm and said second extending leg is connected to an opposite end of said connecting rod.

14. The interlock assembly of claim 11 wherein said first T-shaped connector defines a first cross arm and a first extending leg, and said second T-shaped connector defines a second cross arm and a second extending leg, said first link being connected to one end of said first crossarm and said connecting rod being connected to an opposite end of said first crossarm.

15. The interlock assembly of claim 4 wherein said first pivot post is inserted within a first journal extending from a first wall upstanding from said first base.

16. The interlock assembly of claim 15 wherein said first wall includes a first elongated slot and said first slide includes a first tab, said first tab extending through said first slot and connected with said first T-shaped connector.

* * * * *